April 21, 1970 L. G. SWARTLING 3,507,175
APPARATUS FOR TRANSVERSELY CUTTING A PLURALITY OF
SMALL HOLLOW PLASTIC TUBULAR ELEMENTS EMBEDED
IN A SOLID MATRIX OF PLASTIC MATERIAL
TO MAINTAIN THE ENDS THEREOF OPEN
Original Filed May 22, 1967 6 Sheets-Sheet 1
FIG. 1
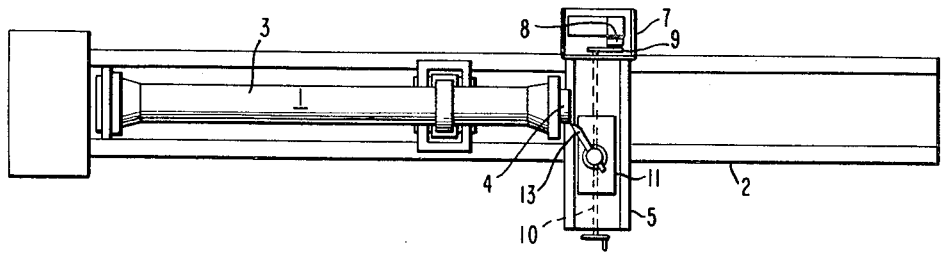
FIG. 2
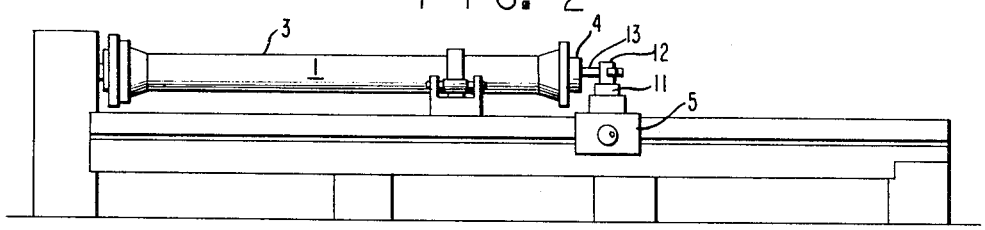
FIG. 3
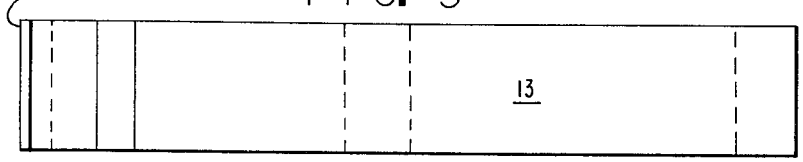
FIG. 4 FIG. 5
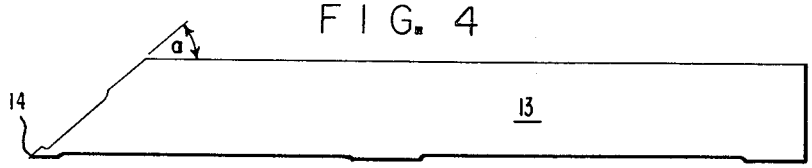 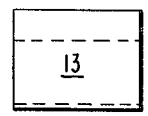
FIG. 6
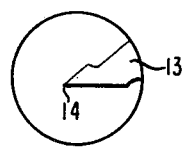
INVENTOR
LENNART GERHARD SWARTLING
BY *[signature]*
ATTORNEY

INVENTOR
LENNART GERHARD SWARTLING

BY
ATTORNEY

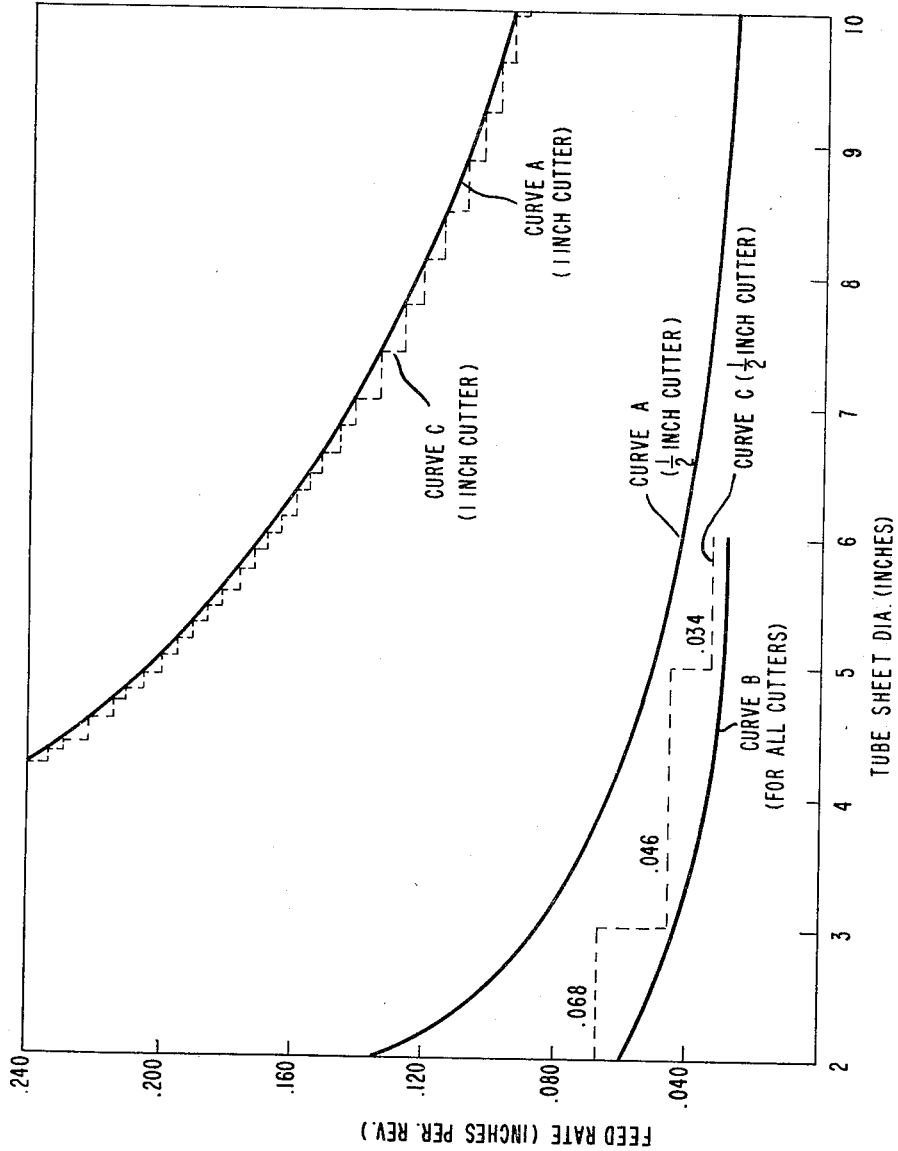

INVENTOR
LENNART GERHARD SWARTLING

BY

ATTORNEY

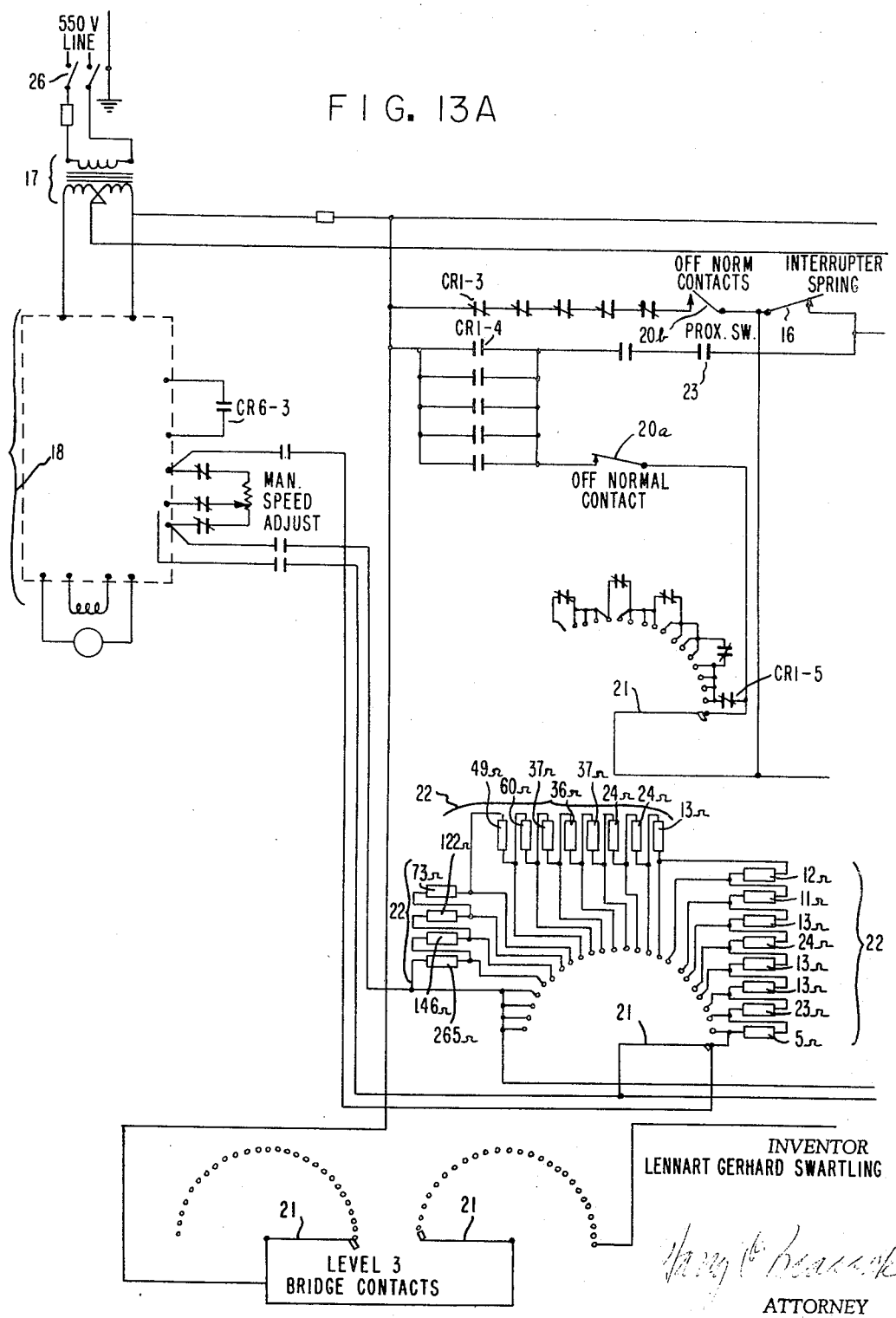

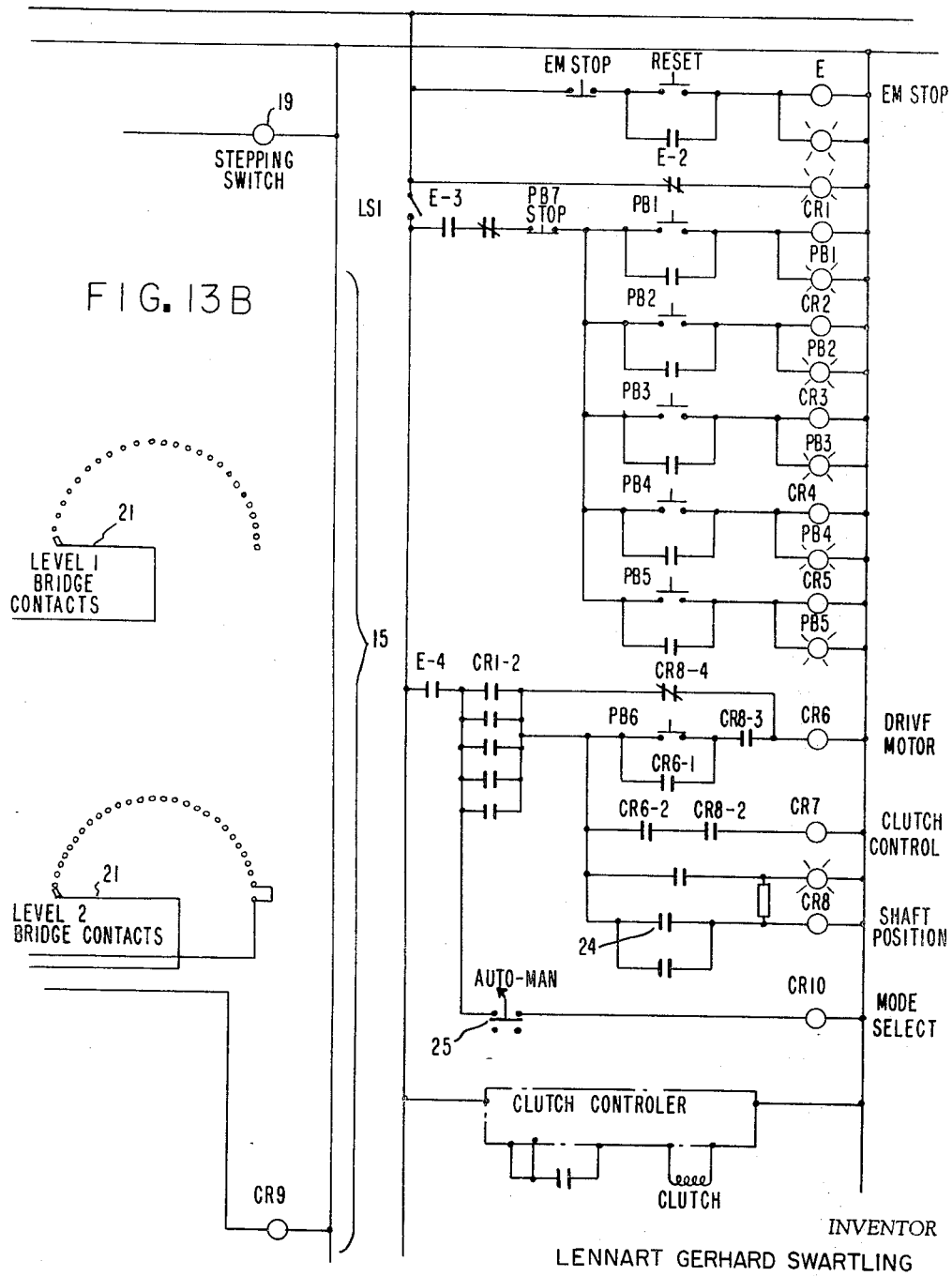

United States Patent Office 3,507,175
Patented Apr. 21, 1970

3,507,175
APPARATUS FOR TRANSVERSELY CUTTING A PLURALITY OF SMALL HOLLOW PLASTIC TUBULAR ELEMENTS EMBEDDED IN A SOLID MATRIX OF PLASTIC MATERIAL TO MAINTAIN THE ENDS THEREOF OPEN
Lennart Gerhard Swartling, 20 Rockrose Drive, Newark, Del. 19711
Original application May 22, 1967, Ser. No. 640,183. Divided and this application Mar. 14, 1969, Ser. No. 817,606
Int. Cl. B23b 1/00
U.S. Cl. 82—47  2 Claims

ABSTRACT OF THE DISCLOSURE

An arrangement for cutting hollow plastic filaments embedded in a solid plastic matrix generally comprising steps of and means for securing a cylindrical solid mass with hollow filaments embedded therein in a driven rotary means and rotating the mass about its longitudinal axis, coarse cutting the end of the rotating mass to square the face just outside the intended final surface, trimming the "squared" end face of the rotating mass with a chisel-shaped cutter beginning at the periphery and progressively advancing the cutter radially inward along the end face. The cutting edge of the cutter being positioned so that the edge length lies in the plane of the end face and is perpendicular to the rotational axis of the permeator with the lower corner of the edge traveling along a line that intersects the corner of rotation, and advancing the cutter at a continuously increasing rate to accommodate for the decreasing diameter of the ridge of material being removed and insure that a given point on the mass engaging a position on the cutter on one revolution of the mass will pass radially outward of the cutting edge without being contacted thereby on any succeeding revolution.

---

CROSS REFERENCES TO RELATED APPLICATION

Maxwell et al., Ser. No. 515,621, filed Dec. 22, 1965.

INTRODUCTION

This application is a division of Ser. No. 640,183 filed May 22, 1967, by the same inventor.

This invention has to do generally with the manufacture of hollow filament permeation separation apparatus and, more particularly, with a method of and apparatus for cutting across densely packed hollow filaments embedded in a cast resinous wall for opening the ends thereof for free passage of fluids into and out of the interior of the hollow filaments.

A principal object of the subject invention is to provide for a simple, rapid and economical method of trimming a resinous tube sheet, or cast wall containing densely packed small hollow tubular elements extending therethrough, the trimming action being carried out transversely of the hollow filaments.

Another object of the invention is to provide a method of trimming a resinous tube sheet without smearing or closing off the hollow filament ends so that a fluid flow rate through the exposed filaments is at least 50 percent of the amount theoretically attainable.

Still another object is to provide for trimming very large diameter resinous tube sheets containing a great plurality of micron size hollow filaments.

Other objects and advantages will appear hereinafter.

BACKGROUND OF THE INVENTION

It is well known in the art that fluid mixtures can be selectively separated by permeation separation through thin-walled membranes.

It is equally well known that selectivity and rate of diffusion are a function of membrane material, thickness, available surface area and differential pressure and the temperature of the fluid mixture.

One technique utilizing different permeation rates through membranes involves elements in the form of small hollow filaments made of organic compositions. Efficient, practical and reliable gas separation through the hollow elements requires novel and improved apparatus and process arrangements such as disclosed in the assignee's pending application S.N. 515,621 to Maxwell et al. filed Dec. 22, 1965. According to the invention filaments preferably between 10 and 500 microns in outside diameter and having wall thicknesses between about 1 and 100 microns are assembled in densely packed groups and encased in an elongated tubular casing assembly. The filaments may be composed of olefin, ester, amide, silicone, ether, nitrile or sulfide polymers; or any other suitable polymer or copolymer depending on the fluid constituent desired to be separated from a mixture. Each end of the tubular casing assembly is closed by a fluid-tight cast wall of polymeric composition such as an epoxy resin. The hollow filaments which are substantially parallel to each other and to the axis of the casing assembly are embedded in and extend through the cast walls in fluid-tight relationship.

In the fabrication of such apparatus it has been found that novel assembly procedures must be employed. For example, in the casting of the epoxy walls, it is extremely important that the composition material seal closely around the filaments and the casing assembly. This is accomplished by rotation of the assembled permeator on a centrifuge apparatus and introduction of the liquid resin at both ends. The permeator is rotated at high speed until the resin is sufficiently hardened. After hardening, or curing, the mold units capping each end are removed and the embedded filament ends are cut off to open and expose the ends of the hollow filaments.

It is in this cutting operation that considerable difficulty has been experienced. Specifically, it has been found that a substantial portion of the micro-size filament openings become smeared closed due to the plastic nature of the resin material under conventional cutting tools with conventional cutting action.

Numerous attempts to eliminate the problem have been tried with only partial success. These have included special resin formulations for improving machineability, slicing and crumbling the epoxy wall material by conventional machining using various combinations of cutting thicknesses, speeds and tool configurations. In each instance, however, smearing has continued to be a persistent problem.

Still other means have been tried to obviate the problem such as fracturing the cast wall by the application of a controlled bending force or a shaped explosive charge. To obtain some measure of predictability of the fracture, specially designed devices are required to apply sufficient and concentrated bending force on the resin wall. The resultant fracture has been found to produce filament openness approaching 100 percent theoretical.

Unfortunately, fracturing is best suited for cast walls below 2 inches in diameter. With larger diameters, above 6 inches, the bending force required to initiate a fracture is excessively large. Likewise, the amount of explosive charge required becomes difficult to control. As a consequence, the resultant fracture is erratic, difficult to predict and usually damages beyond repair the integrity of seal between the cast wall, hollow filaments and the casing.

It is, therefore, in the phase of the permeator manufacture that the improved, simplified cutting concept of this invention has advanced the state of the art specially in the larger size cast wall members.

DESCRIPTION OF THE INVENTION

In the accompanying drawings:

FIGURES 1 and 2 show plan and side elevational views of a typical equipment arrangement used in the cutting operation embodying principles of the invention.

FIGURES 3, 4, and 5 are enlarged plan, side, and end views of the preferred cutter element used in the apparatus of the invention.

FIGURE 6 is a more enlarged view of the cutting edge of the cutter element.

FIGURE 9 is a graph illustrating optimum cutter feedrates for various diameters of the cylindrical mass of material to be cut.

Figure 12:
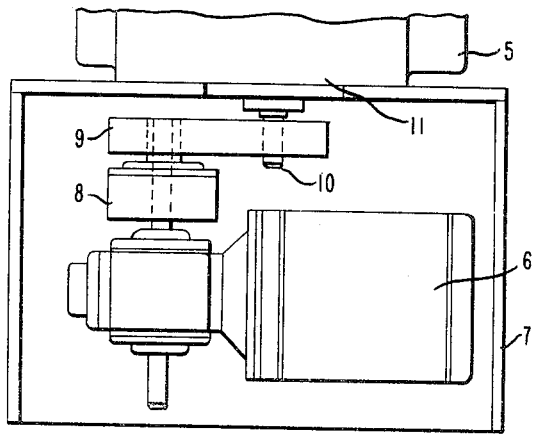
Figure 10:
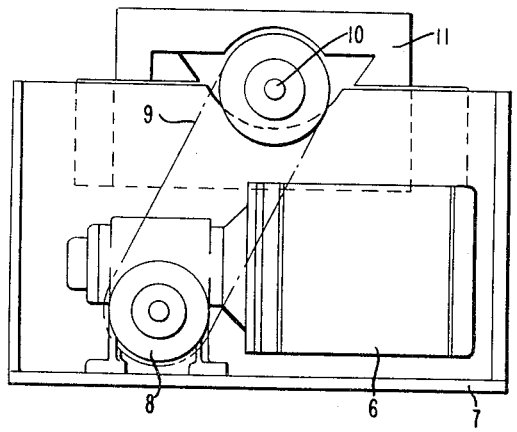
Figure 11:
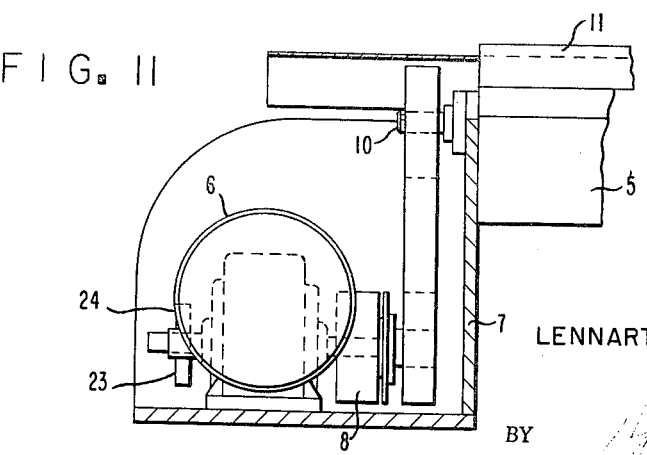

FIGURES 10, 11, and 12 are side, end, and plan views of the cutter traverse drive of the apparatus of the invention.

FIGURES 13A and 13B are a composite schematic showing of the electric circuitry controlling cutter feed drive mechanisms for the apparatus of the invention.

Figure 14:
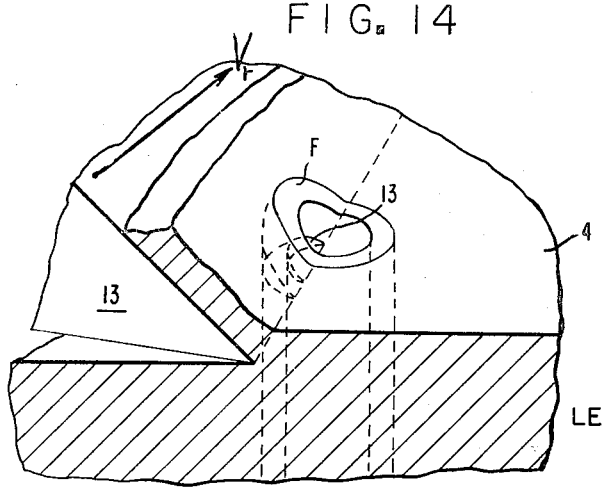

FIG. 14 is an enlarged perspective view of this agreement.

It is standard machine practice to use either a radiused or flat angular tool bit or cutter for turning material on an engine lathe. Because of its shape, the conventional cutter makes single point contact with the material or workpieces. Moreover, the cutter is usually set up or positioned in the lathe wherein the point of contact advances into the material such that the material is removed along the horizontal line radiating from the center of rotation of the workpiece. This is particularly the case in facing cuts; that is, in trimming the end of a rotating workpiece.

Figure 8:
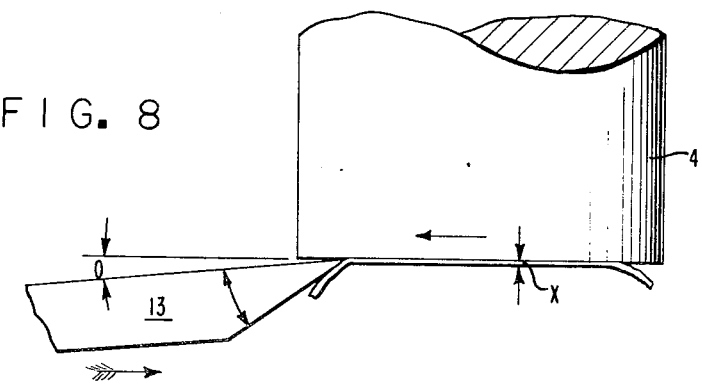
FIGURE 8 is a plan view of FIGURE 7 showing the thickness of the slice of material being removed and angular position of the cutter element.
Figure 7:
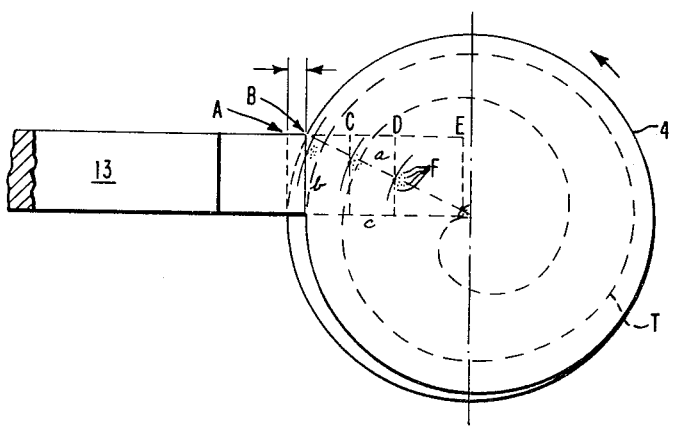
FIGURE 7 is a closeup end view of the cluster element and the end of the cylindrical mass of material being cut showing the cutter element position shortly after cutting has commenced and the track of the cutter element on the mass.

By contrast, the improved method utilizes a specially designed strong rigid cutter element having an elongated chisel-shaped cutting edge which is held parallel to the end face of the workpiece and which removes material by line contact. As shown in FIGURES 7 and 8, the cutter element 13 is set up in a lathe with the cutting edge, which is defined between leading end point L and trailing end point T, perpendicular to the longitudinal axis of the workpiece, or rotating mass, 4 and with the lower corner, or leading end, L of the edge in tangential engagement with the periphery of the rotating mass 4. During a cutting sequence the lower corner, or leading end, L moves along a straight line that intersects the rotational center. A typical cutting stroke or sequence thus begins with the cutter positioned at the circumferential edge at A, moves through points B, C, D, E, and terminates as the lower corner of the cutter edge intersects the rotational center of the workpiece. During the sequence a thin uniform slice of material, preferably about 0.005 inch, is removed. As the cutter advances inward a ridge of material is formed which makes contact with the cutting edge at a very shallow angle less than 20 shown at O in FIGURE 7. This angle remains constant from start to finish even though the ridge continuously diminishes in diameter. Since the operating efficiency of a hollow filament permeator is to a great extent affected by the rate of fluid flow through the bundle of filament opening scheme is one which is capable of shearing the cast epoxy wall in a manner that will produce close to 100 percent filament openness. A measure of the degree of openness can be readily determined by monitoring the fluid flow through the opened filaments after the mass of material in which the filaments are embedded has been cut.

Previously, the most effective filament opening technique involved hand trimming the entire face of the cast wall with a sharp scalpel. Permeators trimmed by such a scheme have recorded fluid flow rates comparable to 50 percent theoretical filament openness. This is illustrated by the following test examples.

Three test cells approximately two inches in diameter containing polyester filaments at 45 percent packing density were cast in an epoxy resin wall.

Each sample was cured for 72 hours and the embedded filaments were trimmed open with a hand scalpel. The epoxy wall was capped in a fluid-tight case and pressurized with dry nitrogen to about 50 p.s.i.g. Approximately 2 liters of gas was allowed to flow through the open filaments. The table below summarizes the flow rates recorded

|  | Total flow (liters) | Time (min.) | Flow rate (cc./min.) |
|---|---|---|---|
| Test cell: |  |  |  |
| 1 | 2 | .330 | 6,060 |
| 2 | 2 | .260 | 7,692 |
| 3 | 1 | .275 | 3,636 |

By comparison, test cells one and two were then subjected to the improved cutting arrangement of this invention under varying conditions such as tool angle and cutting speed. After each cutting sequence the flow rate through each cell was measured. All flow rates were measured using a wet type flow meter manufactured by the American Flow Meter Company. In every instance approximately one liter of dry nitrogen gas was circulated through the open filaments.

The results of each cutting sequence are tabulated below.

| Tool angle, degrees | Experiment | Cutting speed (r.p.m.) | Flow Rate (c.c/min.) Sample 1 | Sample 2 |
|---|---|---|---|---|
| 25 | 1 | 235 | 9,440 | 10,575 |
|  | 2 | 190 | 9,030 | 10,105 |
|  | 3 | 144 | 8,865 | 9,690 |
|  | 4 | 114 | 8,710 | 9,347.5 |
|  | 5 | 70 | 8,650 | 9,570 |
|  | 6 | 27 | 8,565 | 9,215 |
| 40 | 7 | 70 | 9,620 | 10,600 |
|  | 8 | 114 | 9,590 | 10,415 |
|  | 9 | 144 | 9,490 | 10,325 |
|  | 10 | 190 | 9,492.5 | 10,400 |
|  | 11 | 235 | 9,465 | 10,320 |
| 55 | 12 | 235 | 9,650 | 10,650 |
|  | 13 | 190 | 9,350 | 10,325 |
|  | 14 | 144 | 9,350 | 10,210 |
|  | 15 | 114 | 9,175 | 10,200 |
|  | 16 | 70 | 9,200 | 10,240 |
|  | 17 | 27 | 8,887.5 | 10,040 |

The quality of cut; that is, a clean, smearfree cut is dependent to a considerable degree on the rate the material is removed. As shown in FIGURE 7, feedrate of the cutter in a direction transverse to the axis of rotation of the workpiece is a function of the width of its cutting edge, diameter of the workpiece, rotational speed of the workpiece, and the depth of cut. It has been determined that to obtain a clean cut, the cutting tool must be fed into the material at a feedrate corresponding to the geometrical proportions of the cutter and workpiece. Thus, for a given diameter the maximum feedrate must conform to the following mathematical relationship.

If,
$a$ = the radius of the workpiece,
$b$ = the width of the tool cutting edge
and
$c$ = radius of the workpiece minus the maximum feedrate Then the maximum feedrate for a given diameter is $$= a - \sqrt{a^2 - a^2} = a - c$$

From the foregoing it will be seen that an increase in the cutter width "$b$" allows a corresponding increase in the permissible feedrate and a more rapid removal of material. It is critically important, however, in all instances that the feedrate never exceed the limit beyond which the actual cutting action occurs at the upper corner of the cutter. Since the ridge of material continuously decreases in diameter, the feedrate of the cutter is likewise changed to exceed minimum conditions. In FIGURE 9, individual plots of the maximum transverse feedrate for a workpiece diameter describe an optimum feedrate profile which the cutter element preferably should travel during a cutting sequence. Curve A indicates the upper ideal maximum limit and Curve B the lower practical limit for a ½ inch wide cutter. Both curves represent the amount of travel the cutter preferably should make per single revolution of the workpiece at a given diameter. Any feedrate profile in the area between the curves will produce a satisfactory cut. In the preferred embodiment the feedrate is changed in a step-like manner as shown by Curve C. Although the cutter feedrate is independent of the rotary speed of the workpiece there exists a practical limit which is determined by the wear resistance of the cutter material and the thermoplastic character of the resin. It has been found that, for workpiece diameters up to about 12 inches, best results are obtained when the permeator is rotated no greater than 75 r.p.m. and the cutter feedrate is above Curve B. Rotary speeds above that level tend to generate excessive heat at the cutting edge which rapidly deteriorates the edge and plasticizes the resin material.

In general the transverse velocity or feedrate of the cutter element is increased in a manner relative to the length of the cutting edge, and relative to the rotational speed of the workpiece, so that any given point in the rotating workpiece which moves into cutting engagement with a portion of the cutting edge on one revolution of the mass, will pass radially outward of the cutting edge without being contacted thereby on any succeeding revolution in order to eliminate any smearing of the workpiece material over and into the open ends of the hollow filaments and closing off of said open ends with such material.

In FIGURES 1 and 2, a partially fabricated hollow filament permeator apparatus to the kind disclosed in the assignee's pending application S.N. 515,621 to Maxwell et al., is shown rotatably chucked in a modified engine lathe 2. Briefly, the permeator apparatus 1 is a shell and tube type device containing a plurality of densely packed hollow filaments which are encased in a rigid cylindrical shell or casing 3 and embedded at the ends in cast epoxy walls 4 which function as fluid-tight tube sheets. Following casting and curing of the epoxy walls the end faces are sheared or cut away to expose the hollow interiors of the embedded filaments. The description which follows has to do with a method and the apparatus for cutting the resinuous material without obstructing the filament openings due to smearing of the cast material or flattening of the filaments.

Still referring to FIGURES 1 and 2, engine lathe 2 is a modified commercial metal turning machine which has a headstock capable of a twenty-five inch rotary swing and twenty foot long bed sufficient for accommodating very long length permeator units. Except for the modifications incorporated, a detailed description of the lathe will not be given since a typical example of such a lathe is the Mark III Model TB machine manufactured by Binns and Berry, Ltd., Halifax, England. Specifically, the modifications involve a specially designed drive for traversing the cross slide 11 on the carriage 5 through a predetermined velocity or feedrate program as described hereinafter. In particular, carriage 5 is provided with a D.C. variable speed motor 6 of the type manufactured by the Century Electric Company of St. Louis, Mo., for driving the cross slide 11. As shown in FIGURES 10, 11, and 12 motor 6 is mounted on a bracket 7 and is functionally independent of the main machine drive. Bracket 7 is a rigid weldment which is affixed to one end of the carriage 5 for traversing therein. The output shaft of motor 6 is operatively connected to a commercial electric 8 and a timing belt and pulley arrangement 9 and feedscrew 10 which drives the movable cross slide 11. Cross slide 11 supports a conventional tool holder or post 12 into which is affixed a chisel-shaped cutter 13.

As best shown in FIGURES 3, 4, 5, and 6, cutter element 13 is a specially designed tool made of a high speed tool steel manufactured by the Cleveland Twist Drill Company under the trade mark of "Nomax." The cutter element 13 comprises an essential cutting edge 14 about one inch in length all of which engages the workpiece at a very shallow angle during a cutting sequence.

As best shown in FIGURES 3, 4, 5, and 6, cutter element 13 is a specially designed tool made of a high speed tool steel manufactured by the Cleveland Twist Drill Company under the trade mark of "Nomax." The cutter element 13 comprises an essential cutting edge 14 about one inch in length all of which engages the workpiece at a very shallow angle during a cutting sequence. The tool angle "a" of cutter 13 may vary anywhere from 25° to 55° but is preferably maintained at about 40°. It has been found that one important feature of cutter 13 is the sharpness of cutting edge 14 from the standpoint of producing smearless cutting and obtaining reasonable wearlife. In the preferred embodiment, care is taken to form edge 14 with a sharpness radius no greater than .00002 inch and a surface flatness within 2 optical light bands.

Referring to FIGURES 7 and 8, and 14 cutter element 13 is positioned preferably in the tool post 12 such that the lower corner, or leading end L of the edge 14 is coincident with the horizontal axis of the permeator unit cast wall member 4. Under the above arrangement, cutting takes place above the rotational axis of the resin wall 4 with actual material removal being done by line contact. This is in distinct contrast with conventional lathe techniques which utilize round or single point contact tools that are set at the horizontal axis of rotation. Cutter 13 is set against the face of wall 4 at a very shallow angle "o" no greater than 2° to clear the freshly trimmed face. Thus the entire length of edge 14 remains above the rotational axis of wall 4 and is parallel with the end face during a cutting sequence.

The output speed of motor 6 is changed by variations in the input voltage. Changes are induced by an electrical control circuitry which is designed to initiate the voltage variations automatically.

As shown in FIGURES 13A and 13B, the essential elements of the control circuitry comprise a single phase 60 cycle power transformer 17 which steps down the supply voltage to 240–120 volt levels. The 240 volt tap on transformer 17 is connected to a solid state AC-DC power rectifier and controller 18 which is a commercial unit manufactured by the Square D Company. The 120 volt tap is connected to the control circuitry which is composed of the stepping switch, speed selection and position-drive circuits. Each of these is described in detail below.

The stepping switch circuit.—A three level bridge-type rotary selector switch 15 is electrically connected to a self-interrupting (impulsive type) switch 16. Both switches are commercial items which can be purchased from the Automatic Electric Company. Interrupter switch is composed of a stepping switch coil 19 and a dual set of interrupter contacts or springs 20a and 20b. A pawl and ratchet mechanism responsive to the movable plunger of the coil 19 operatively actuates the springs 20a, 20b and a triple deck rotary contactor 21. Each time coil 19 is energized, the circuits governed by springs 20a and 20b are momentarily opened while contactor 21 is indexed to the next set of terminals. The terminals on the number one level of the selector switch 15 are connected to contact points of five speed control relays, CR1, CR2, CR3, CR4 and CR5. These are discussed in more detail later. Terminals on the number two level of switch 15 are connected to fixed resistance elements 22 which are electrically connected in series with each other so that as the contactor 21 is indexed from one terminal to the next, the net control voltage level to motor 6 is changed a predetermined amount. Specific values of the individual elements 22 are chosen to drive the motor 6 at speeds which ultimately cause the cross slide 11 to traverse at a continuously increasing rate in accordance with the velocity profile of curve C. The number three level terminals of the switch 15 are connected to a "homing" relay CR9 which functions to return the contactor 21 to the start point following completion of a cutting sequence. At the third terminal following the final speed change terminal on the number two level of switch 15, contactor 21 energizes the coil of homing relay CR9 which opens the circuitry to motor 6 and clutch 8 thereby stopping the movement of cross slide 11.

Coacting with the interrupter spring 20a is a proximity switch 23 (see FIGURES 10, 11, and 12) which is attached to the output shaft of motor 6 and which takes over the function of spring 20a during the cutting sequence. Interrupter spring 20b is connected in series with the OFF-Norm Contacts of interrupter switch 16 and provides the means by which contactor 21 returns to the home or start position. It is noted that the OFF-Norm Contacts are closed when the contactor 21 leaves the start position.

The speed select circuit.—The lathe 2 is intended for trimming five sizes of permeator ranging from 12, 10, 8, 6 and 4 inch diameters. The five control relays CR1, CR2, CR3, CR4 and CR5 precedingly mentioned correspond to the different permeator diameter start points. Each relay is provided with multi-contacts one set of which is operatively connected to the number one terminal level of stepping switch 15 while other contacts are part of the circuitry controlling motor 6 and clutch 8 operation. The contacts connected to the stepping switch 15 are located across terminals of the resistance elements 22 in accordance with feedrate for a given distance from the center of rotation of the cast wall 4. In other words control relay CR1 determines the starting speed of the cutter 13 for a 12 inch diameter permeator which happens to be the required feedrate when the cutter 13 is at its farthest point. At that point the feedrate is at the minimum rate. Accordingly, contacts CR1–5 are across the highest resistance level and thus the slowest speed range of motor 6. Conversely, control relay CR5 is associated with a four inch diameter permeator so that the lowest resistance value and consequently the highest speed of motor 6.

An emergency stop relay E coacting with a reset push button PB9 operates the various speed control relays. Emergency stop relay E is provided with a red indicator lamp which signals the operator the status of the machine. Controlling the coil portions of the speed control relays are a momentary push buttons PB1, PB2, PB3, PB4 and PB5. Depending on the size of the permeator, the operator depresses the proper button and energizes the corresponding speed control circuitry.

The position-drive circuit.—The position-drive circuit contains three control relays CR6, CR7 and CR8. Control relay CR6 is provided with a start push button PB6 which energizes the circuit furnishing power to motor 6 and control relay CR7 which actuates the controller coil of electric clutch 8. Control relay CR8 is coupled to a proximity switch 24 which like switch 23 is located on the output shaft of motor 6. Switch 24 serves as a shaft positioning means by which cutter 13 is located relative to the start up position. Relays CR6, CR7 and CR8 are controlled from the emergency stop relay E, and the five speed control relays.

A manual and automatic switch 25 controlled by a mode select relay CR10 permits switching the cutting sequence from automatic to manual operation.

Lastly, limit switch LS1 is attached to the control lever for actuating the lead screw driving the carriage 5. When the carriage control lever is in the operative position; that is, carriage 5 is in motion, switch LS1 is off. The switch serves as a lockout assuring that the automatic cutting sequence does not commence unless carriage 5 is motionless.

In operation, one end of a permeator unit 1 is securely chucked in the rotary headstock of the lathe 2 and the other is suitably journaled in a conventional steady rest as is the normal practice for long length workpieces. For purposes of simplifying the discussion trimming of a 12 inch diameter eight foot long permeator will be described. It is understood that a substantially identical procedure is followed with other size permeators. Any minor variations in procedure for a particular permeator will be pointed out during the discussion.

After the permeator is secured properly, carriage 5 is moved into position adjacent its external end face. It is assumed at this point that the end portion of the cast wall 4 was previously removed by suitable means such as by sawing, for example. After the headstock drive is actuated and the speed adjusted so that the permeator 1 is revolving about its longitudinal axis at 18 to 20 revolutions per minute, the operator performs a rough face cut on the cast wall using a conventional single point tool for purposes of "squaring" the face. It is noted that the rough cut can be made in a separate operation on an ordinary lathe.

Following the rough cut, the operator substitutes the single point tool with the cutter element 13 on the cross slide 11, the cross slide 11 and carriage 5 are then positioned so as to bring the cutting edge 14 adjacent the periphery of the cast wall 4. A final fine adjustment of carriage 5 is made whereby cutter 13 is in position to remove preferably about a 0.005 inch thick slice from the wall 4 face. The thickness of the slice can vary between about 1 and about 12 times the outside diameter of the embedded filaments, the thickness of the material in the slice cooperating with the tangential slicing action of the cutting edge to provide sufficient lateral support to the ends of the filaments being cut to prevent flattening and closing off of said hollow filaments by the cutter element. When the operator shifts the carriage control lever on the landscrew driving the carriage 5 to the off position, limit switch LS1 is closed. As previously mentioned, this switch serves as one of the interlocks guarding the traverse feed control circuitry from premature operation.

As best shown in FIGURES 13A and 13B, the operator now closes the power supply switch 26 to power transformer 17 thereby energizing controller 18 and the remaining control circuitry of the cutter traverse mechanism. A red emergency lamp lights on the control panel indicating the power is on and motor 6 is inoperative. The operator then proceeds with the start up procedure by pressing reset button PB9 which energizes the coil of the emergency stop relay E. This relay has contacts E–2 which at that instant, turn off the emergency stop lamp and light up a green ready lamp. Simultaneously, contacts E–3 and E–4 close place the Speed-Select and Position-Drive circuits in the operative condition. Since a twelve inch diameter permeator is to be trimmed, the operator manually presses push button PB1 which energizes the coil of speed control relay CR1. Relay CR1 was selected because contact CR1–5 on the stepping switch 15 is located across the terminals have a net resistance which will produce a maximum output speed from motor 6. Similarly, a set of contacts of the other speed control relays CR2, CR3, CR4 and CR5 are connected across the remaining terminals at various resistance levels. Thus for a four inch diameter permeator, the operator would energize relay CR5 by depressing push button PB5.

As speed control relay CR1 is activated all contacts are transferred; that is, contacts CR1–2, CR1–4 are closed and contacts CR1–3, CR1–5 are opened. Upon closing of contacts CR1–2, the feedscrew or shaft position relay CR8 is energized opening contacts CR8–4.

Simultaneously, contacts CR1–3, CR1–5 are opened and the following sequence follows. Because the position and change in feedrate of the cutter 13 is determined by the number of revolutions the feedscrew 10 makes from start up, it is necessary that the start up position coincide with the cast wall 4 edge and a predetermined start point on the output shaft of motor 6. A shaft position relay CR8 responsive to the proximity switch 24 on the output shaft of motor 6 provides the necessary locating controls. Since the shaft position relay contacts CR8–4 are normally closed, motor drive relay CR6 is energized after a speed control relay is selected. This results in the motor drive relay contacts CR6–1, CR6–2 and CR6–3 closing. Upon closing of CR6–3, motor 6 starts to operate, however, shaft position relay CR8 is not energized and because contact CR6–2 on the clutch control circuit is in series with contact CR8–2 clutch 8 remains disengaged. Motor 6 thus operates until the output shaft closes the proximity switch at which time the shaft and cutter 13 start positions coincide. When switch 24 is closed, shaft position relay CR8 is energized and contacts CR8–2, CR8–3 close while contact CR8–4 on the motor drive circuit opens. The latter contact denergizes motor drive relay CR6 opening CR6–2, CR6–3 and stopping motor 6. The start position of the motor 6 output shaft (feedscrew 10) and the start point of cutter 13 are now interlocked. At this time the operator receives a dim green light on the run indicator lamp which signals that a trimming sequence can begin.

Simultaneously, during the shaft position sequence the following parallel operation occurs. When contact CR1–4 of the speed control relay closed in the Stepping Switch Circuit, the operating coil of the interrupter switch 16 was energized causing the rotary contactor 21 to index from one terminal to the next. The contactor 21 continues to move until it comes across an open terminal. In this case contactor 21 stopped at the CR1–5 terminal position because the circuit at that point was opened when the operator selected push button PB1. The operator now depresses run push button PB6 energizing motor drive relay CR6. Since position shaft relay CR8 is energized, CR8–2 is closed and as CR6–2 contact closes in the clutch control circuit, clutch controller relay CR7 is energized closing contact CR7–2 which engages the clutch 8. Concommitantly, contact CR6–3 closes and motor 6 begins to operate driving the feedscrew 10 and cross slide 11. As the feedscrew 10 rotates the second proximity switch 23 located adjacent switch 24 opens and closes with each revolution. Switch 23 assumes the function of interrupter spring 20b since the spring 20b circuit is dead due to the open contact at CR1–5. With each opening and closing of proximity switch 23 the coil of interrupter switch 16 is intermittently energized enabling the rotary contactor 21 to index to the next set of terminals.

As the contactor 21 indexes to the successive terminals, the output speed of motor 6 is increased incremental amounts resulting in a corresponding increase in the feedrate of cutter 13. The sequence continues uninterrupted until the contactor 21 reaches a terminal on the third level of the stepping switch 15 that energizes homing relay CR9. At that instant, contact point CR9–1 in the speed select circuitry opens, speed control relay CR1 drops out and OFF-Norm contacts close. All contacts of relay CR1 revert back to the condition shown in FIGURES 13A and 13B. With contact CR1–2 open, motor 6 stops and clutch 8 is disengaged. Contact CR1–3 now is closed and rotary contactor 21 continues to index to the home or start position by way of the OFF-Norm contacts and interrupter spring 20b circuit. When the contactor 21 reaches the start or home position (at 46) the OFF-Norm Contacts open and the cutting sequence is terminated. The trimmed permeator is removed and a new unit positioned and trimmed by the same procedure described above.

The above described apparatus and method offer the following advantages:

Simple high speed low cost smearless machining of epoxy resin material.

Reduced generation of heat at the cutting edge due to line contact type cutting as opposed to conventional point contact.

The ability to handle large diameter permeators on a high productivity basis automatically.

Use of a relatively inexpensive, simple tool cutter having prolonged wearlife.

The technique does not require highly skilled personnel.

Although we have disclosed a preferred embodiment of the invention in detail as required by the patent statute, many modifications and variations within the spirit of the invention will occur to those skilled in the art, and all such modifications and variations are considered to fall within the scope of the following claims.

What is claimed is:

1. An improved process for smoothly progressively cutting a thin transverse slice from an end portion of a three-dimensional mass of solid polymeric material having a circular transverse cross section of a given radius and an axis of symmetry perpendicular to said transverse cross section, said mass having embedded therein a plurality of very small hollow filaments substantially parallel to said axis, said filaments between 10 and 500 microns outside diameter and having wall thickness between about 1 and about 100 microns, said filaments formed of a polymeric composition; said process comprising the following steps in combination, supporting such a mass in a given position for rotaton about its said axis, rotating the mass about its said axis at a predetermined speed, moving a cutter element having a cutting edge of a predetermined length, said edge having a leading end and a trailing end, in a transverse direction perpendicular to the axis of rotation of the rotating mass so that the leading edge of the cutter element moves into tangential cutting engagement with the rotating periphery of one end of said mass to cut a slice of predetermined thickness therefrom, controlling the movement of the cutter element in the transverse direction so that the cutter element is moved at a first transverse velocity at the point of engagement with said mass and at a second higher transverse velocity at the point where the cutting edge intersects the axis of the rotating mass, said predetermined speed of rotation being sufficiently low relative to the radius of the circular transverse cross section of the mass and relative to the first transverse velocity of said cutter element to avoid appreciable frictional heating of the material of the mass or of the cutting edge, the first transverse velocity of said cutter selected relative to the length of the cutting edge, relative to the radius of the transverse cross section of the mass, and relative to the rotational speed of the mass such that the engaged cutting length of the cutting edge is slightly less than the total length thereof during the first revolution of the mass after the cutting action has commenced, then increasing the transverse velocity of said cutter element in a manner relative to the length of the cutting edge so that any given point on the rotating mass which moves into cutting engagement with a portion of the cutting edge on one revolution of the mass, will pass radially outwardly of the cutting edge without being contacted thereby on any succeeding revolution in order to substantially eliminate any smearing of the material of the mass over and into the open ends of the hollow filaments and closing off of said open ends with such material.

2. The improved process of claim 1 in which the predetermined thickness of said slice lies between about 1 and about 12 times the outside diameter of the embedded filaments, the thickness of the material in the slice cooperating with the tangential slicing action of the cutting edge to provide sufficient lateral support to the ends of the filaments being cut to prevent flattening and closing off of said hollow filaments by said cutter element.

References Cited

UNITED STATES PATENTS

| | | | |
|---|---|---|---|
| 3,011,374 | 12/1961 | Walker et al. | 82—48 |
| 3,118,333 | 1/1964 | Pilcher II et al. | 82—47 |
| 3,218,894 | 11/1965 | Ho Chow | 82—101 |

HARRISON L. HINSON, Primary Examiner